Figure 1:
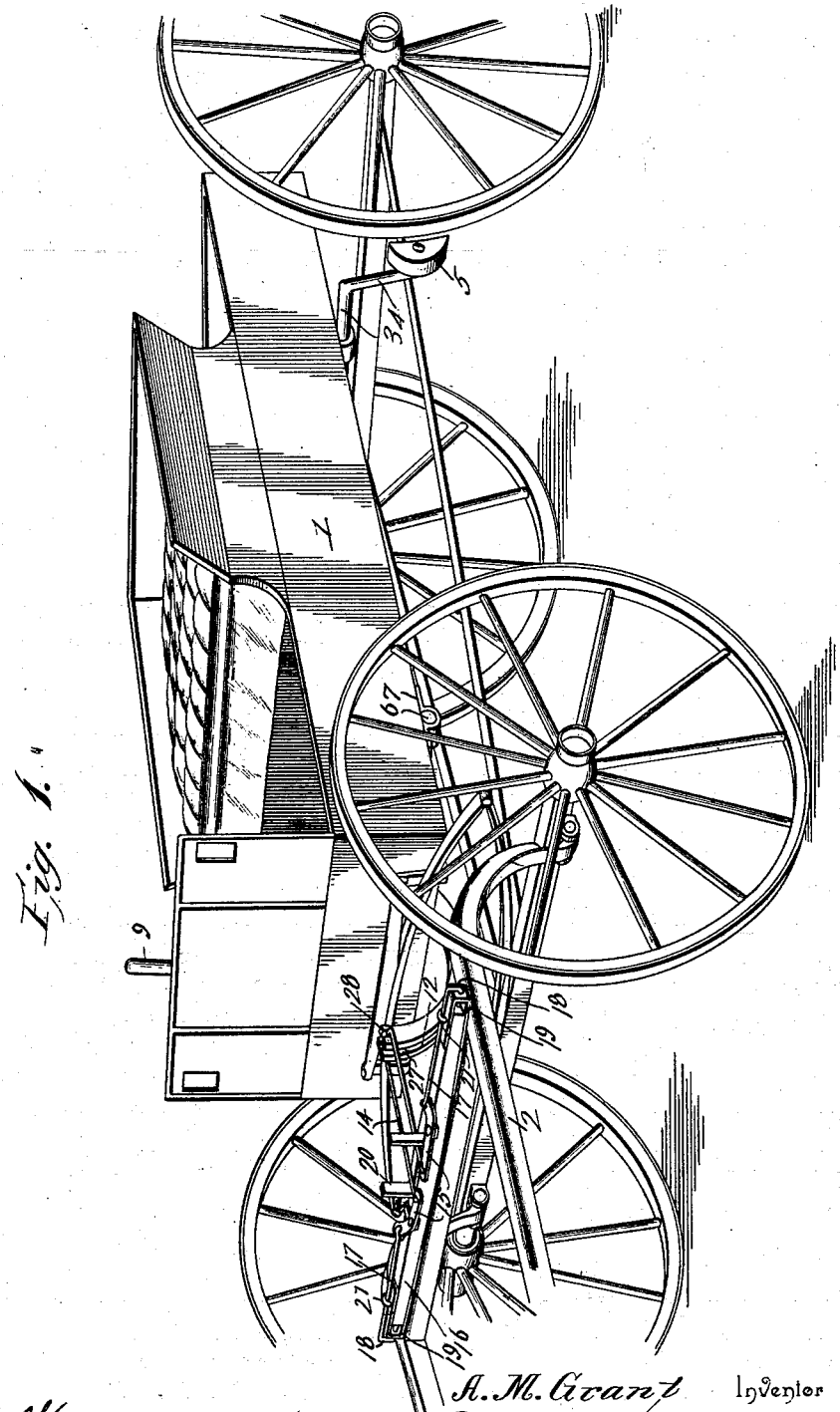

No. 657,531. Patented Sept. 11, 1900.
A. M. GRANT.
HORSE DETACHER AND BRAKE.
(Application filed May 8, 1900.)
(No Model.) 2 Sheets—Sheet I.

Witnesses
L. H. Walker.
Chas. S. Hyer.

A. M. Grant, Inventor
by C. A. Snow & Co.
Attorneys

No. 657,531. Patented Sept. 11, 1900.
A. M. GRANT.
HORSE DETACHER AND BRAKE.
(Application filed May 8, 1900.)
(No Model.) 2 Sheets—Sheet 2.
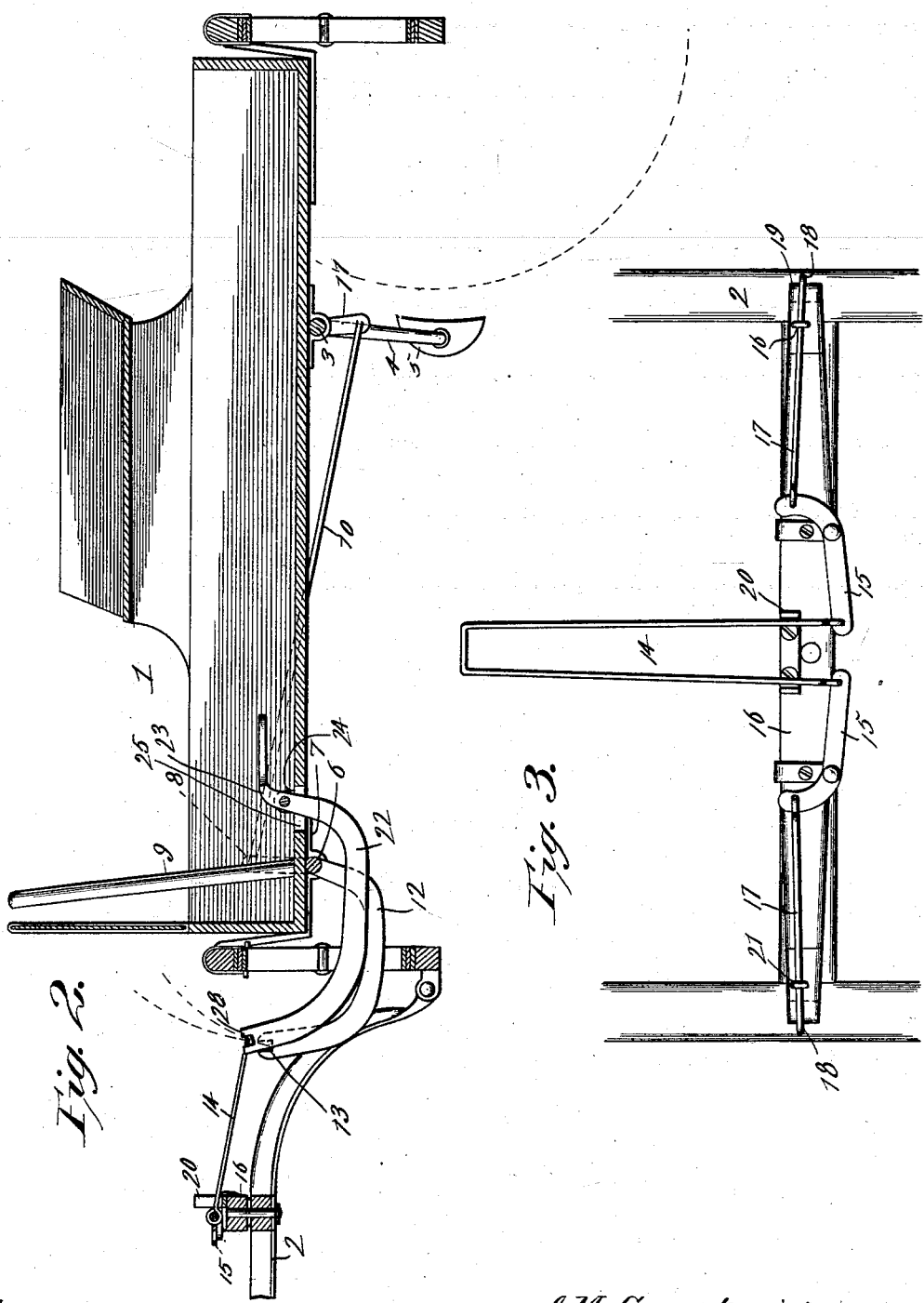
Witnesses
C. H. Walker.
Chas. S. Hoyer.
A. M. Grant Inventor
by C. A. Snow & Co.
Attorneys

UNITED STATES PATENT OFFICE.

ARMSTEAD M. GRANT, OF CHERRY VALLEY, ARKANSAS.

HORSE-DETACHER AND BRAKE.

SPECIFICATION forming part of Letters Patent No. 657,531, dated September 11, 1900.

Application filed May 8, 1900. Serial No. 15,922. (No model.)

*To all whom it may concern:*

Be it known that I, ARMSTEAD M. GRANT, a citizen of the United States, residing at Cherry Valley, in the county of Cross and State of Arkansas, have invented a new and useful Horse-Detacher and Brake, of which the following is a specification.

This invention relates to a horse-detaching and brake attachment for a vehicle particularly applicable to buggies and similar light vehicles, but equally-well useful on heavier like devices; and the object of the same is to provide simple and effective means in combination with a vehicle for quickly detaching a horse and braking the same in the event of a runaway or under other conditions and capable of individual operation to permit the use of the brake portion without affecting the detaching elements, the actuating devices being within convenient reaching distance of the driver or occupant of the vehicle.

The invention consists in the construction, arrangement, and combination of the several parts, hereinafter more fully described and claimed.

In the drawings, Figure 1 is a perspective view of a vehicle embodying the features of the invention. Fig. 2 is a longitudinal vertical section of the body portion of a vehicle and a portion of the thills, showing the improved mechanism. Fig. 3 is a plan view of a portion of the thills, showing the detaching mechanism thereon.

Similar numerals of reference are employed to indicate corresponding parts in the several views.

The numeral 1 designates the vehicle-body, preferably of a light character and supplied with the usual appurtenances, such as thills 2 and a brake-bar 3, having end arms 4, with brake-shoes 5 attached thereto. Under the front portion of the body 1 a rock-shaft 6 is mounted in opposite bearings 7 and has a crank-arm 8 at one end and an operating-lever or hand-bar 9, movably projecting upwardly through the bottom of the body. From the crank-arm 8 a connecting-rod 10 runs rearwardly to the crank-arm 11 of the brake-bar 3, and depending from the center of the rock-shaft is a lifting-arm 12, which is of substantial U shape and has its front end normally in advance of the front end of the vehicle-body. The lifting-arm is adapted to be operated independently of the remaining portion of the attachment, which will be presently described, and has its front end transversely slotted, as at 13, to engage the rear closed end of an open link 14, of elongated form for operating the detaching mechanism. The front ends of the said link are attached to the inner ends of levers 15, pivotally mounted on the whiffletree 16, and to the outer terminals of said levers the inner ends of slide-rods 17 are movably connected and have their outer ends formed with downwardly and inwardly directed hooks 18. The free extremities of the said hooks slide through cap-straps 19 over the ends of the whiffletree, which form pockets or inclosures to receive the rear ends or connecting devices of the traces, the said hook extremities moving into close engagement with ends of the whiffletree to provide secure means for holding the trace ends. The link 14 is held in central position by an upstanding U-shaped guide 20, secured on the central upper portion of the whiffletree, and the rear closed end of said link is always in proper position for engagement by the front end of the lifting-arm and other devices, which will now be described.

The mechanism thus far described is adapted for unitary action in detaching the horse from the whiffletree and thills, as it will be seen that a force exerted on the lever or hand-bar 9 to draw the same in a rearward direction will cause the brake-shoes 5 to be forced against the rear wheels and simultaneously elevates the lifting-arm 12, which catches the rear closed end of the link 14 standing thereover, and draws the inner ends of the levers 15 toward the vehicle-body, and thereby the slide-rods 17 are shoved outwardly to disengage the extremities of the hooks 18 from the trace ends or connecting devices thereon, the said slide-rods being guided in their movement by staples or other analogous devices 21. By this means the forward motion of the vehicle will be checked simultaneously with the release of the horse or draft-animal.

The horse-releasing devices are operated by a releasing-lever 22, also of substantially U-shaped form, and having its rear upper end 23 pivoted between fulcrum-ears 24, secured to the bottom of the body 1 and located on opposite sides of a slot 25, through which said end of the lever has free play. The upper rear end 23 of the releasing-lever terminates in a horizontally-disposed tread or pressure plate 26 within easy reaching distance of the occupant of the vehicle, and the front end of said lever is bifurcated, as at twenty-seven, to form means for the free play therethrough of the lifting-arm 12, the duplex front ends of the said releasing-lever being also in advance of the front end of the vehicle-body and transversely slotted, as at 28, to catch the rear closed end of the link 14. The brake can be operated without actuating the releasing-lever 22 by pressing down the plate 26 and disconnecting the brake from the releasing devices and permitting it to be used to check the progress of the vehicle, and in this operation the engagement of the lever 22 with the link 14 will not be disturbed, in view of the fact that when the releasing-lever is elevated at its front extremity the subsequent upward movement of the front end of the lifting-lever will be free and out of contact with the link, because of the difference in the arc of movement of the two parts that engage the link, as shown by dotted lines in Fig. 2. It will also be seen that the several parts can be restored to normal position very easily, and the simple structure of the component elements of the improved device renders their application to vehicles now in use, as well as in the original manufacture of the latter, readily attainable without material expense and with the manifold advantages accruing from their use.

Changes in the form, size, proportions, and minor details may be resorted to without departing from the principle of the invention.

Having thus described the invention, what is claimed as new is—

1. In a device of the character set forth, the combination with a vehicle-body and thills therefor, of brake mechanism, a rock-shaft at the front of the vehicle-body connected to the brake mechanism and having a lifting-lever rigidly attached thereto and extending forwardly in advance of the said body, the front upturned end of the said lever being transversely slotted, an independently-operative releasing-lever pivotally supported on the front portion of the vehicle-body and also having its free extremity upturned and in advance of the vehicle-body and transversely slotted, the said free end of the releasing-lever being adjacent to the free end of the lifting-lever, trace-releasing devices on the thills, and an elongated link having its front extremities movably attached to the trace-releasing devices and its rear closed end loosely engaging the transverse slot of the releasing-lever and in position for engagement with the front slotted end of the lifting-lever, both levers having vertical movement.

2. In a device of the character set forth, the combination with a vehicle-body and thills therefor, of a brake mechanism, a rock-shaft at the front under portion of the vehicle-body connected to the brake mechanism and having an operating-lever and a downwardly-extending forwardly-projecting lifting-lever with an upturned transversely-slotted end freely disposed in advance of the vehicle-body, an independently-operative releasing-lever also pivotally connected to the under front portion of the vehicle-body and extending downwardly and forwardly and provided with a free upturned bifurcated extremity having transversely-slotted end portions, the free end of the lifting-lever being movable upwardly and downwardly through the bifurcated extremity of the releasing-lever, trace-releasing devices in connection with the thills and including inner levers attached to hooked slide-rods, and an elongated link having its front ends attached to the said inner levers and its rear closed portion loosely engaging the slotted end portions of the bifurcated extremity of the releasing-lever across the path of movement of the said lifting-lever.

In testimony that I claim the foregoing as my own I have hereto affixed my signature in the presence of two witnesses.

ARMSTEAD M. GRANT.

Witnesses:
W. H. BARNES,
J. M. LEVESQUE.